US012147986B1

(12) United States Patent
Gittino et al.

(10) Patent No.: US 12,147,986 B1
(45) Date of Patent: Nov. 19, 2024

(54) MACHINE LEARNING CREATION AND USAGE OF CLUSTER VISUALIZATIONS

(71) Applicant: Citigroup Technology, Inc., Weehawken, NJ (US)

(72) Inventors: Paola Gittino, Riverview, FL (US); William George Cormier, Clearwater, FL (US); Steve Thomas Dayton, Brandon, FL (US); Miriam Silver, Tel Aviv (IL)

(73) Assignee: Citigroup Technology, Inc., Weehawken, NJ (US)

( * ) Notice: Subject to any disclaimer, the term of this patent is extended or adjusted under 35 U.S.C. 154(b) by 0 days.

(21) Appl. No.: 18/379,405

(22) Filed: Oct. 12, 2023

Related U.S. Application Data

(63) Continuation-in-part of application No. 14/707,852, filed on May 8, 2015, now abandoned.

(60) Provisional application No. 62/079,110, filed on Nov. 13, 2014.

(51) Int. Cl.
*G06Q 20/40* (2012.01)
*G06T 11/20* (2006.01)

(52) U.S. Cl.
CPC ........ *G06Q 20/4016* (2013.01); *G06T 11/206* (2013.01); *G06T 2200/24* (2013.01)

(58) Field of Classification Search
CPC .......................... G06Q 30/0603; G06Q 50/01
See application file for complete search history.

(56) References Cited

U.S. PATENT DOCUMENTS

| 8,751,399 B2 | 6/2014 | Kolhatkar et al. |
| 2010/0100492 A1 | 4/2010 | Law et al. |

OTHER PUBLICATIONS

Office Action for U.S. Appl. No. 14/707,852, Apr. 21, 2023, 8 pages.

(Continued)

*Primary Examiner* — Aryan E Weisenfeld
(74) *Attorney, Agent, or Firm* — Perkins Coie LLP

(57) ABSTRACT

Methods and systems for network analysis, modeling, and visualization of electronic data involve using a machine learning algorithm for generating, in a relationship visualization aspect of a graphical user interface, a visualization consisting at least in part of a plurality of icons, each icon representing an interacting entity, and activating a visualization consisting at least in part of an element disposed between each of a plurality of pairs of the plurality of icons representing interactions between the users. The machine learning algorithm identifies communities of users based on created models of each interacting user. The machine learning algorithm displays the visualization based on predictions of how the display will be acknowledged by a viewer. The machine learning algorithm makes predictions of how an interacting user and the community will evolve over time.

18 Claims, 12 Drawing Sheets

(56) References Cited

OTHER PUBLICATIONS

Final Office Action for U.S. Appl. No. 14/707,852, Oct. 13, 2020, 7 pages.
Final Office Action for U.S. Appl. No. 14/707,852, Nov. 6, 2015, 25 pages.
Final Office Action for U.S. Appl. No. 14/707,852, Dec. 21, 2016, 43 pages.
Office Action for U.S. Appl. No. 14/707,852, Feb. 17, 2021, 8 pages.
Office Action for U.S. Appl. No. 14/707,852, Jun. 16, 2016, 34 pages.
Office Action for U.S. Appl. No. 14/707,852, Jun. 18, 2020, 8 pages.
Office Action for U.S. Appl. No. 14/707,852, Jul. 28, 2015, 19 pages.

| Month | Number of Entities | Number of Connections | Community of Interest | Number of Community Entities | Number of Community Connections | Number of Assortativity by Customer Type | Number of Assortativity by SAR History | Density | Clustering | Direct Acyclic Graph |
|---|---|---|---|---|---|---|---|---|---|---|
| OCT | 88 | 56 | 1 | 4 | 3 | -50 | -100 | 0.5 | 0 | TRUE |
| DEC | 86 | 52 | 1 | 4 | 3 | -50 | -100 | 0.5 | 0 | TRUE |

*Identical Values* (columns: Community of Interest through Direct Acyclic Graph)

ONE OR MORE PROCESSORS COUPLED TO MEMORY GENERATE, IN A RELATIONSHIP VISUALIZATION ASPECT OF A GRAPHICAL USER INTERFACE, A VISUALIZATION CONSISTING AT LEAST IN PART OF A PLURALITY OF ICONS, EACH ICON REPRESENTING A TRANSACTING ENTITY.

S2

THE ONE OR MORE PROCESSORS ACTIVATE, ALSO IN THE RELATIONSHIP VISUALIZATION ASPECT OF THE GRAPHICAL USER INTERFACE, A VISUALIZATION CONSISTING AT LEAST IN PART OF AN ELEMENT DISPOSED BETWEEN EACH OF A PLURALITY OF PAIRS OF SAID PLURALITY OF ICONS REPRESENTING TRANSACTIONS BETWEEN TRANSACTING ENTITIES.

S3

THE ONE OR MORE PROCESSORS ENCAPSULATE, LIKEWISE IN THE RELATIONSHIP VISUALIZATION ASPECT OF THE GRAPHICAL USER INTERFACE, A VISUALIZATION OF AT LEAST ONE COMMUNITY OF ICONS CONSISTING OF AT LEAST A PORTION OF SAID PLURALITY OF PAIRS OF ICONS, AT LEAST ONE MEMBER OF SAID COMMUNITY OF ICONS REPRESENTING A TRANSACTING ENTITY HAVING A HISTORY OF ANOMALOUS TRANSACTIONS.

FIG. 12

MACHINE LEARNING CREATION AND USAGE OF CLUSTER VISUALIZATIONS

CROSS-REFERENCE TO RELATED APPLICATIONS

This application is a continuation-in-part of U.S. patent application Ser. No. 14/707,852, filed May 8, 2015, which claims the benefit of U.S. Provisional Application No. 62/079,110, filed Nov. 13, 2014. The content of the foregoing application is incorporated herein in its entirety by reference.

FIELD OF THE INVENTION

The present invention relates generally to the field of network analysis, modeling, and visualization, and more particularly to methods and systems for using machine learning for analyzing, modeling, and generating in a graphical user interface a visualization of electronic data related to fraudulent activities.

BACKGROUND OF THE INVENTION

Current approaches to fraudulent interaction detection may involve monitoring individuals and their interactions to detect anomalous behavior. Such approaches may include, for example, rule-based monitoring and peer group comparison. Rule-based monitoring may involve the use of scenarios and thresholds to monitor the behavior of users, and peer group comparison may involve comparing an individual's behavior to that of the individual's peer group.

These current methods may rely, for example, on aggregated transactional attributes at the user or account level to create an 'alert' in the system. Such current methods may focus, for example, on user access to secure data. In such methods, the cumulative activity over a certain period of time may be used to determine whether users are changing security levels more frequently or at a higher rate than is considered normal. In another example, such current methods may focus on monetary instrument activity. In such methods, a static set of rules may be run on the cumulative activity over a certain period of time to determine whether values are considered inside the norm or deviate from what is considered typical banking usage specific to a particular customer or account type. After a set of static rules is run and alerts are created, analysts may be assigned to investigate the alerted activity and to determine whether or not the alerts represent a concern.

Current investigation procedures require only that the research extends to parties present in alerted transactions, and no research is conducted on entities with whom such parties interact. In other words, current investigation procedures extend only one level deep, such as to an account, the account owner, and interactions with the account.

Thus, under current procedures, analysts are never presented with information about other direct or indirect connections that the entities of interest may have, and whether those connections are suspicious. Accordingly, relationships between such entities may be hidden from analysts because the 'larger picture' is not available in current investigation procedures. The resulting undetected anomalous connectivity patterns may represent a significant threat to the institution.

There is a present need for a solution that resolves all of the foregoing issues and provides, for example, improved methods and systems for analysis, modeling, and graphical user interface visualizations of electronic data related to behavior that may be likely to be associated, for example, with fraudulent activity.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the analyzing, modeling, and generating of visualizations of electronic data described herein. Such embodiments provide methods and systems for using machine learning processes to provide graphical user interface visualizations that may involve, for example, generating, by one or more processors coupled to memory, in a relationship visualization aspect of a graphical user interface, a visualization consisting at least in part of a plurality of icons, each icon representing a transacting entity; activating, by the one or more processors, in the relationship visualization aspect of the graphical user interface, a visualization consisting at least in part of an element disposed between each of a plurality of pairs of said plurality of icons representing transactions between transacting entities; and encapsulating, by the one or more processors, in the relationship visualization aspect of the graphical user interface, a visualization of at least one community of icons consisting of at least a portion of said plurality of pairs of icons, at least one member of said community of icons representing a transacting entity having a history of anomalous transactions.

In aspects of embodiments of the invention, the at least one member of the community of icons representing a transacting entity having a history of anomalous transactions may comprise, for example, the at least one member of the community of icons representing a transacting entity reported to a governmental authority for suspected unlawful activity. In other aspects, encapsulating the visualization may involve, for example, encapsulating a visualization of a plurality of communities of icons, at least one member of each community of icons representing a transacting entity having a history of anomalous transactions. In additional aspects, the at least one member of each community of icons representing a transacting entity having a history of anomalous behavior may comprise, for example, at least one member of each community of icons representing a transaction entity reported to a governmental authority for suspected unlawful activity. In further aspects, each transacting entity reported to a governmental authority for suspected unlawful activity may be represented, for example, by an icon having a different appearance from an appearance of an icon representing each transacting entity identified in a transaction with said transacting entity reported to governmental authorities for suspected unlawful activity. In still further aspects, each transacting entity reported to a governmental authority for suspected unlawful activity may be represented, for example, by an icon having an appearance indicating a level of risk of unlawful activity associated with the transacting entity.

Further aspects of embodiments of the invention may involve, for example, receiving, by the one or more processors, transactional data elements related to each transacting entity represented by one of said plurality of icons. In additional aspects, the transactional data elements related to each transacting entity may comprise, for example, data elements related to a transacting entity risk level, a transacting entity history of having been reported to a governmental authority for suspected unlawful activity, a transaction entity type, and a transaction entity transaction history for a pre-defined period of time. Other aspects may involve, for example, receiving, by the one or more processors, transactional activity data elements summarized for each transacting entity represented by one of said plurality of icons. Still other aspects may involve, for example, receiving, by the one or more processors, transactional data elements related to a plurality of transactions between transacting entities represented by at least one of said plurality of pairs of icons. In still further aspects, the transactional data elements related to the plurality of transactions between transacting entities represented by at least one of said plurality of pairs of icons may comprise, for example, aggregated value of the plurality of transactions between said transacting entities, total transaction amount and count for the plurality of transactions between said transacting entities, and average time lag between transactions between said transacting entities.

In additional aspects of embodiments of the invention, the element disposed between each of the plurality of pairs of the plurality of icons representing transactions between transacting entities may comprise, for example, an element disposed between each of the plurality of pairs of said plurality of icons indicating a direction of flow of transactions between transacting entities. In other aspects, the element disposed between each of the plurality of pairs of said plurality of icons indicating a direction of flow of transactions between transacting entities may comprise, for example, an arrow indicating a direction of flow of transactions between said transacting entities. In still other aspects, the element disposed between the plurality of pairs of said plurality of icons representing transactions between transacting entities may comprise, for example, an element having an appearance indicating a transaction amount and count of transactions between said transacting entities. In further aspects, the element having an appearance indicating a transaction amount and count of transactions between said transacting entities may comprise, for example, an element having a size indicating a transaction amount and count of transactions between said transacting entities. In still further aspects, the element disposed between each of the plurality of pairs of said plurality of icons representing transactions between transacting entities may comprise, for example, an element having an appearance indicating a level of risk of unlawful activity associated with each transaction.

In other aspects of embodiments of the invention, encapsulating the visualization of at least one community of icons, at least one member of said community of icons representing a transacting entity having a history of anomalous transactions may involve, for example, encapsulating the visualization of at least one community of icons, at least one member of said community of icons representing a transacting entity having a history of suspicious transactions reported to a governmental authority. In still other aspects, encapsulating the visualization of at least one community of icons, at least one member of said community of icons representing a transacting entity having a history of anomalous transactions may involve, for example, encapsulating the visualization of at least one community of icons, at least one member of said community of icons representing a transacting entity transacting with a transacting entity having a history of suspicious transaction reported to a governmental authority. In further aspects, encapsulating the visualization of the at least one community of icons may involve, for example, encapsulating, by the one or more processors, in the relationship visualization aspect of the graphical user interface, a discrete visualization of the at least one community of icons.

In other example, the machine learning algorithm further processes the connection datasets and labels communities of icons that have higher clustering of anomalous transactions. The machine learning algorithm is able to identify clustering effects based on connections and correlations that are not apparent to a user viewing the visualizations.

The machine learning algorithm is used to learn user interactions and behavior when interpreting clusters, and based on learning, adapt visualizations to help a user to prioritize findings by criticality and by an amount of attention required. For example, when communities of icons have a higher risk, or the anomalous activities are more egregious, then the visualizations may evolve to properly highlight the risks by being bigger or brighter, have different colors or shapes, or in any way be more recognizable by a viewer. The machine learning algorithm will not only be able to identify more dangerous fraudulent activities, but also help to properly highlight the risks more effectively.

In another example, the machine learning algorithm is applied to detect the communities or groups that are more likely to have anomalous transactions. The machine learning algorithm provides the results of the connections, nodes, and communities by generating probabilities and associated suggestions of a visual indication of the communities.

The machine learning algorithm may further predict how the communities are likely to evolve or form. The likelihood of specific users to join a community may be predicted. Some users may be identified before they become a member of an anomalous community. These users or communities may be given closer inspection or reduced privileges.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 10 is a table that illustrates an example of a similar pattern found in data for two separate months for a case employing network analysis and visualization according to embodiments of the invention;

FIG. 12 is a flow chart that illustrates an overview example of the graphical user interface electronic data visualization process for embodiments of the invention.

DETAILED DESCRIPTION OF THE INVENTION

Figure 1:
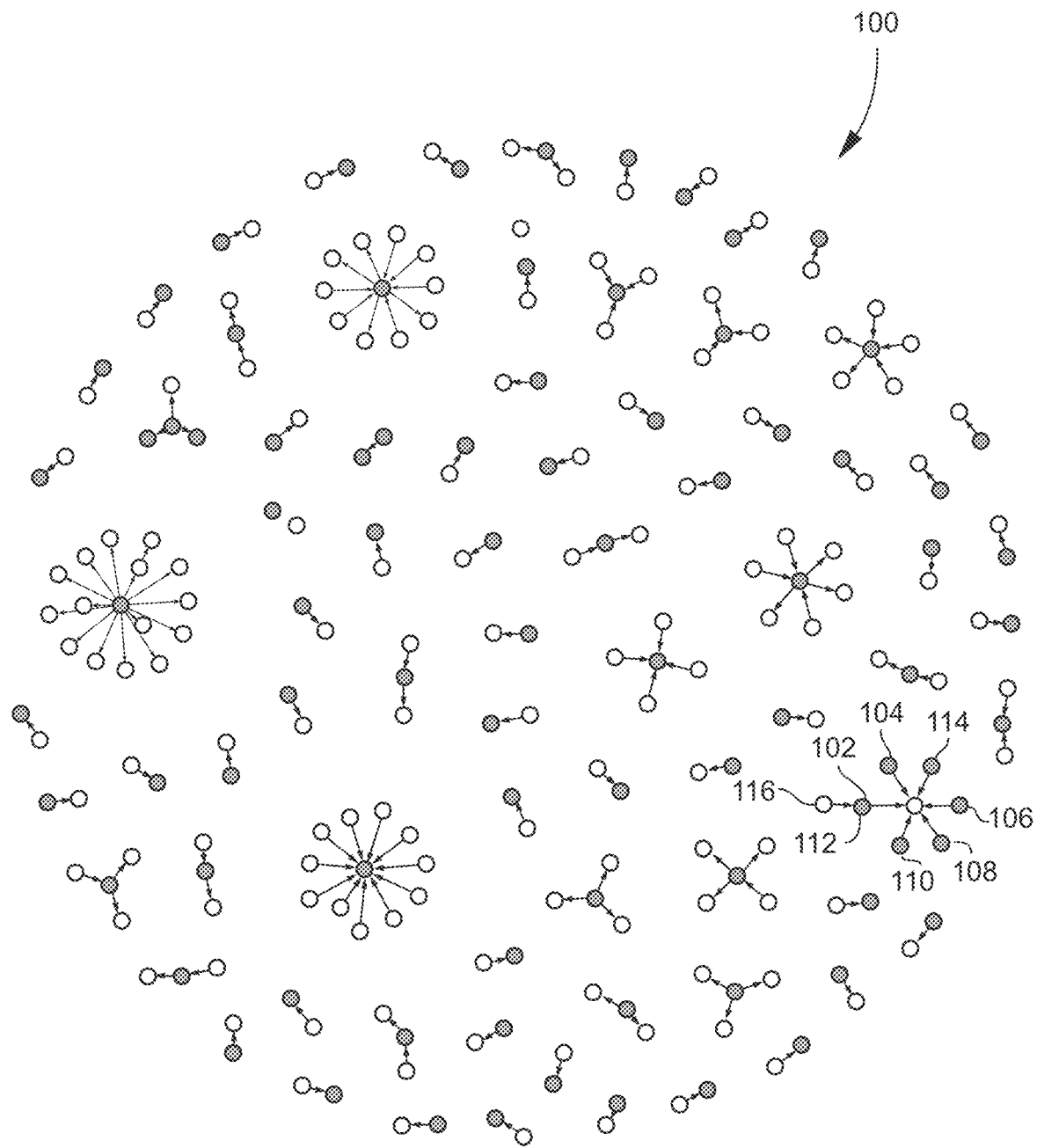
FIG. 1 illustrates an example of graphic visualization of a network of entities of interest based on transactions of those entities according to embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention employ computer hardware and software, including, without limitation, one or more processors coupled to memory and non-transitory computer-readable storage media with one or more executable computer application programs stored thereon that instruct the processors to perform the network analysis, for example, in a selected group of customers and to use machine learning algorithms, methods, or processes to analyze, model, and generate, in a graphical user interface, one or more visualizations of electronic data related to behavior, such as behavior that may be likely to be associated with fraudulent activities.

As noted, undetected anomalous connectivity patterns that result from current fraud investigations may represent a significant threat to the fraud risk coverage of an institution, such as a data provider, an insurance company, a bank, a social media company, or any other institution that works to protect data and assets from fraudulent interactions. Embodiments of the invention employ network analysis, modeling, and electronic data visualization concepts to address and mitigate that risk. The network analysis, modeling, and data visualization techniques for embodiments of the invention enable an institution to identify and generate visualizations of relationships between entities, define communities of interest within networks, and analyze network growth patterns based on such visualizations. Such techniques for embodiments of the invention provide additional insights to the investigation process and identify linkages not detected by current procedures.

Because the analysis and visualization creation and correction in certain examples are performed by the machine learning system based on data collected by the data acquisition system, human analysis or cataloging is not required. The process is performed automatically by the machine learning system without human intervention, as described in the Machine Learning section below. The amount of data typically collected from the entities, institutions, the third-party providers, and the other data sources may include thousands to tens of thousands of data items for each user. The total number of users may include all of a financial institution's clients, all of a cellular provider's clients, all of the users on a social network, or the users from any other third-party provider. Human intervention in the process is not useful or required because the amount of data is too great. A team of humans would not be able to catalog or analyze the data in any useful manner to create user models as described.

Such embodiments may involve, for example, receiving, using a processing engine computer having a processor coupled to memory, data elements related to a plurality of entities from one or more databases. The plurality of entities may comprise, for example, entities reported to authorities, entities reported to authorities as a result of a specific rule, including both individuals and commercial entities, as well as immediate parties found in the transactional data of such entities. Data elements received may encapsulate attributes related to these entities such as entity risk level, a history of reports to authorities, and type of entity (e.g., individual or commercial) in combination with transactional activity seen in a pre-defined period of time.

In further aspects of embodiments of the invention, received transactional activity data elements may be summarized at a customer level in order to simplify a granularity of observations and to accelerate the process of identifying the most relevant links. In a similar way, if more than one transaction is found between the same pair of entities, the relationship may be represented in terms, for example, of their aggregated values, total transactions amount and count, average time lag between transactions, and other relevant data. Following data retrieval, data results may be encoded as visual objects in a graphic display, an example of which is illustrated in FIG. 1.

FIG. 1 illustrates an example of a graphic visualization 100 of a network of entities of interest-based transactions of those entities according to embodiments of the invention. Referring to FIG. 1, each entity may be mapped as a unique node that retains the correspondent attributes of the entity that is represented by the node. Each node may be shown as an icon, such as a square or circle or some other suitable device. Referring to FIG. 1, entities that, for example, have been reported to authorities for unexplained anomalous behavior, such as entities 102, 104, 106, 108, 110, 112, may be represented in the visualization 100 by icons of a particular color or shape, and all other entities, such as entities 114, 116 may be represented by icons of a different color or shape. Further, transactions between entities may be represented in the visualization as links activated between nodes corresponding to the respective entities. Such links may be in the form, for example, of arrows that indicate a direction of flow of transactions between entities.

The data-driven systems performing the methods described in the example of FIG. 1 may be enhanced with machine learning process capabilities that can be used to update the visualizations. The machine learning process receives as inputs the received data as described above. A model may be created of a user based on an input of user histories of interactions, transactions, or other actions as described above. The machine learning system may be any machine learning or artificial intelligence function of the memory-coupled processor, such as a software component of the memory-coupled processor, a hardware logically connected to the memory-coupled processor, or any other function, process, algorithm, or application.

The process of creating the model is performed automatically by the systems enhanced by the machine learning system without human intervention, as described in the Machine Learning section below. The machine learning system may employ techniques, including Natural Language Processing (NLP) and deep neural networks.

These types of algorithms or processes may be used for analyzing timestamps and numerical and textual data associated with the user accounts and interactions. The textual data might include interaction descriptions, notes, or other narrative elements associated with each user or interaction. Machine learning models trained on this textual data can extract meaningful information, detect hidden relationships, and identify potential discrepancies that are missed by the humans. For instance, if human auditors missed potentially fraudulent indicators, NLP models could identify and correct these errors by comparing the textual data with assigned labels from approved interactions.

The machine learning system may map each user, or a created network model of a user, as a unique node that retains the correspondent attributes of the entity that is represented by the node. Each node may be shown as an icon, such as a square or circle or some other suitable device. Referring to FIG. 1, entities that, for example, have been reported to authorities for unexplained anomalous behavior, such as entities 102, 104, 106, 108, 110, 112, may be represented in the visualization 100 by icons of a particular color or shape, and all other entities, such as entities 114, 116 may be represented by icons of a different color or shape. The machine learning system may prepare the particular colors, shapes, or configurations of nodes to be more distinct for a human viewer based on a feedback of actions into the machine learning system.

For example, when certain fraudulent users are depicted with a different color, the machine learning system may receive feedback that indicates that human analysts did not take any action related to the color, but did take action related to nodes that had a different color. The machine learning system may use the feedback to bias future selections of node presentation.

The machine learning system may make predictions about how different depictions of the users in a visualization will be interpreted by a human analyst or viewer. Based on feedback of human actions taken based on the visualizations, the machine learning system is able to draw subtle inferences about the connection between depictions of users and communities in the visualizations and how humans interpret them. The machine learning system is able to take the connections and create new visualizations that are easier for humans to understand. For example, if a particular arrangement of nodes with potentially fraudulent nodes in a specific color or configuration causes more engagement with analysts, then the machine learning system may determine that a more pronounced arrangement with more drastic color selections may create even greater engagement.

As the machine learning system recognizes greater levels of fraud from a user or a community, the machine learning system creates more drastic or contrasting visualizations. When the machine learning system is used to detect—that certain arrangements in the visualization create less engagement, then the machine learning system may trigger-self-retraining with that data to further evolve the visualizations.

Figure 2:
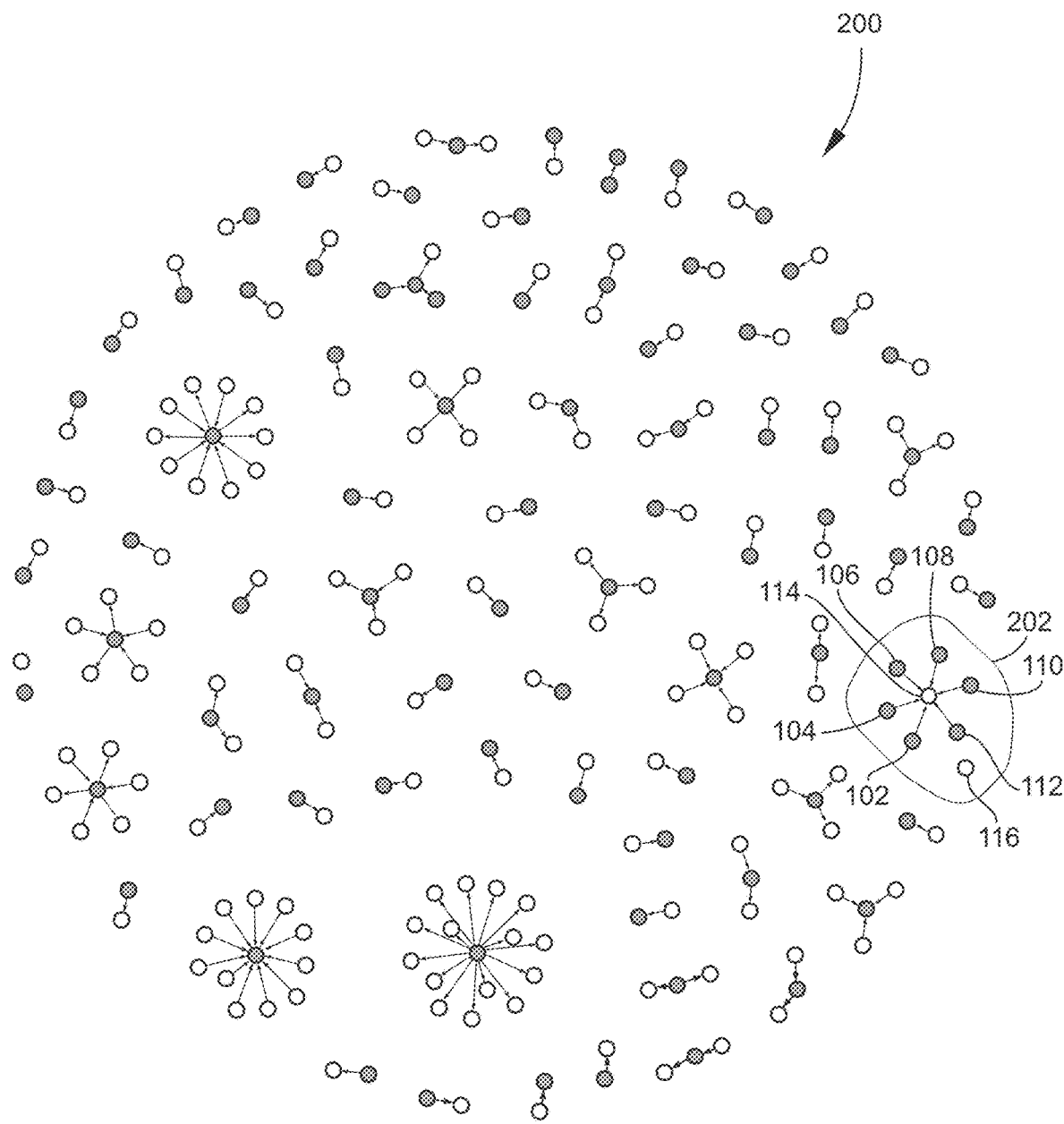
FIG. 2 illustrates an example a graphic visualization of a community of interest from the network of entities of interest of FIG. 1 according to embodiments of the invention.

As noted, an aspect of embodiments of the invention may involve, for example, identifying communities which are relevant, for example, to fraud monitoring or merely identifying isolated components in the network of entities of interest 100 of FIG. 1. FIG. 2 illustrates an example of a graphic visualization of a community of interest 200 from the network of entities of interest 100. One or more community-finding algorithms may be employed in identifying such communities of interest. Examples of such algorithms may include, for example, WalkTrap, Infomap, Fast-Greedy, or Modularity, among others. Algorithms may be used interchangeably depending on time, complexity, and on adequate parameter selection. It is to be understood that the above-identified algorithms are examples only and that embodiments of the invention are not limited to employment of a particular algorithm or combination of algorithms.

As illustrated in FIG. 2, a result, for example, of one or more community finding-algorithms may be generation of a visualization of one or more distinguishable groups of closely connected entities, such as community 202. A community, such as community 202, may include, for example, entities 102, 104, 106, 108, 110, 112 shown in FIG. 1 that may be further analyzed individually. Each of the identified communities may be consecutively analyzed as a single new object, and new attributes may be derived from a network structure of the particular community, such as community 202, including, for example a total number of entities reported to authorities, a path length of flow of funds, and clustering and centrality measures.

The identification of the communities may be performed by the systems with enhancement by a machine learning system. For example, the machine learning system may receive the data of all of the users of the institution and the created FIG. 1. The machine learning system may process the connection related data of the nodes to infer communities where human observers may not see communities. That is, the machine learning system may receive inputs of data related to the users, subsequent actions of the users, or other inputs to find subtle patterns, connections, correlations, or trends that indicate that users belong in a configured community even though the users may not have immediately observable connections to the community.

In another example, the machine learning system may be used to enhance the creation of models of users based on the received data. The machine learning system compares the models to the models of other users to find commonalities or connections between the models to create communities of user models. For example, a determined community of users is identified and the attributes of the users in the community are identified. New users that join the community are also identified. The machine learning system may determine that another user is likely to follow a similar pattern and join the community in the future. The determination may be based on unseen patterns or connections that are identified by the machine learning system using one or more algorithms described herein but are unobservable to humans. The prediction that certain users are likely to join certain communities may be based on the patterns or predicted behaviors of user models.

When a user is identified as likely to join a community that has a higher likelihood of fraudulent activities, the user may be flagged as needing closer or additional scrutiny. For example, the machine learning system may observe future actions of the user to determine if the user is performing predicted actions that might lead to fraud. In another example, the machine learning system may notify a human analyst to perform an investigation of the flagged user. In another example, the machine learning system may provide a closer inspection of future interactions of the user to determine if any of the interactions are potentially fraudulent.

In another example, the machine learning system recommends a reduction in the privilege level of the user based on a prediction that the user is likely to become a fraudulent user or join a fraudulent community. That is, the user may have a spending limit imposed that is lower than typical, the user may have reduced access to sensitive information, the user may lose access to interactions with users in certain locations, or the user may have any other activities limited by the machine learning system.

In another example, the machine learning system recommends a reduction in the privilege level of an entire community based on a prediction that one or more users in the community is likely to become a fraudulent user. That is, the community may have a spending limit imposed on each user in the community that is lower than typical, the community may have reduced access to sensitive information, the community may lose access to interactions with users in certain locations, or the community may have any other activities limited by the machine learning system.

The methods of the machine learning system to determine communities may not be understandable by human observers because the connections between users may be too subtle of complex for human observance.

Figure 3:
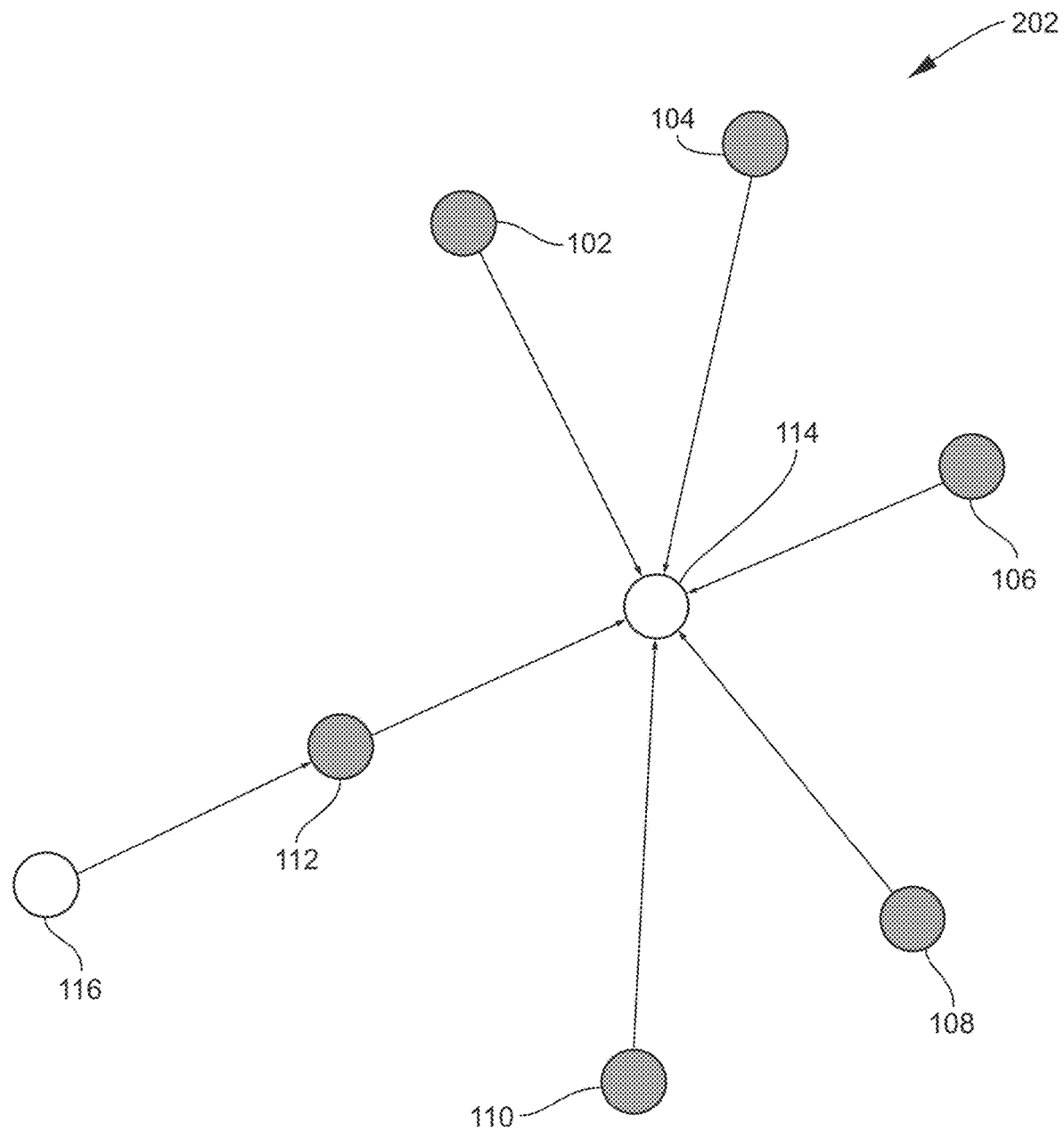
FIG. 3 illustrates an example of an expanded view a previously-identified community of interest in which entities and transaction details are also encoded and visualized according to embodiments of the invention.

FIG. 3 illustrates an example of an expanded view of a previously identified community of interest in which entities and transaction details are also encoded and visualized according to embodiments of the invention. The visualization of such community of interest may be discrete (i.e., separate and distinct). Moreover, visualizations of communities found may be generated, as illustrated in FIG. 3. Such visualizations may be further analyzed to explore the activity occurring within a set of entities. The transactional data details contained in the limits of the communities may also be encoded and included in such visualizations.

As noted, current procedures may not consider information about direct or indirect connections between parties who do not have histories of anomalous activities, such as entities 114, 116 in FIGS. 1-3, and other parties that have such histories, such as entities 102, 104, 106, 108, 110, 112 in FIGS. 1-3, which may result in undetected anomalous connectivity patterns that represent a significant fraud risk. Conversely, visualizations for embodiments of the invention may show, for example, connections between parties without a history of anomalous activity and other parties with a history of such activity that may uncover connectivity between such parties indicative of anomalous behavior. The machine learning system is able to identify these connections by observing the subtle interplay of the users and connections between users and communities that are unobservable by humans.

As noted, the MANTAS® AML product of ORACLE FINANCIAL SERVICES® is an example of a rule-based fraud monitoring product that is currently in use. The MANTAS® product, for example, employs scenarios (e.g., programs or applications) utilizing specific logic and algorithms to find anomalous behavior and may also employ thresholds and population segmentation to further tailor rules. Unfortunately, such scenarios generate far more non-productive alerts than productive ones, and extensive tuning and optimization is required to increase productivity. In addition, intensive analyst research is needed to identify patterns of anomalous behavior, and it is difficult to tell whether or not anomalous behavior is intentional.

As also noted, another current approach to fraud monitoring is peer group analysis, in which all individuals (e.g., accounts and customers) are placed into groups with similar demographic and descriptive characteristics. An individual's behavior may then be compared to an average behavior of the individual's peer group, and anomalous individual behavior may be alerted for further research. Peer group analysis is dependent upon robust customer and account information, and a financial institution, such as a bank, may typically have a limited number of descriptors that can be used for defining peer groups. It is self-apparent that the fewer descriptors available, the broader the definition of a peer group may be. Thus, many non-productive alerts are likewise generated using peer group analysis.

Machine learning systems that perform network analysis and visualization for embodiments of the invention may involve, for example, a determination of how entities, such as commercial and consumer accounts with a financial institution, interact with one another. A network may comprise the connections between such entities. Embodiments of the invention may employ, for example, visual components of link analysis to display connections between such entities. However, it is to be understood that network analysis for embodiments of the invention may differ from link analysis, which is a visual tool for displaying connections between entities and which involves neither modeling nor prediction of behavior. It is to be further understood that network analysis for embodiments of the invention may apply machine learning systems that use a multi-disciplinary statistical/mathematical approach for describing, modeling, and predicting connections within a network.

For example, in aspects of embodiments of the invention, periodically, such as monthly, cash transaction data may be analyzed with respect to amounts and transaction locations. Transactions which are executed, for example, at least a predetermined geographic distance from an address of an account holder may be flagged as worthy of further investigations. A customer number of the account holder may be selected, and a financial institution database may be searched for cases with the same customer number as those in the suspect cash transactions. A report may be generated which lists all the suspect customer numbers and any case numbers for the same customer. In addition, connections between entities representing flows of funds may be identified and a visualization, such as illustrated in the example of FIG. 4, may be generated.

Figure 4:
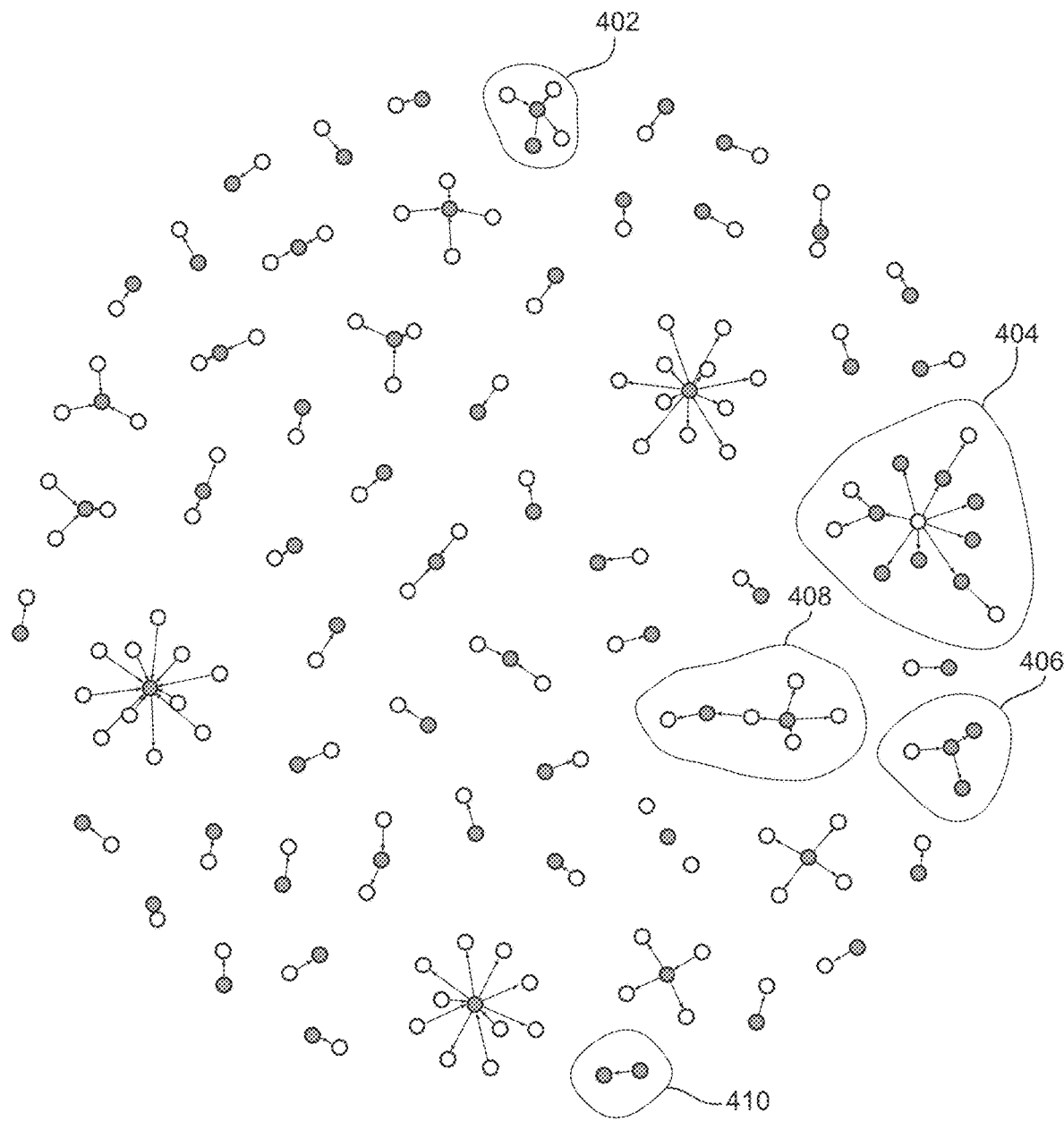
FIG. 4 illustrates an example of a graphic visualization of communities of entities defined by connections which the entities have to one another identified using automated network analysis for embodiments of the invention.

FIG. 4 illustrates an example of a graphic visualization of communities of entities defined by connections which the entities have to one another identified using automated network analysis for embodiments of the invention. Referring to FIG. 4, automated network analysis algorithms for embodiments of the invention may be employed to detect and visualize communities of entities defined by the connections that entities have to one another. Referring to FIG. 4, the visualization may include a relatively large number of connectors representing transactions between the entities. Further, anomalous connectivity patterns may be found in certain of the communities, such as the encapsulated entities forming communities 402, 404, 406, 408, 410.

Figure 5:
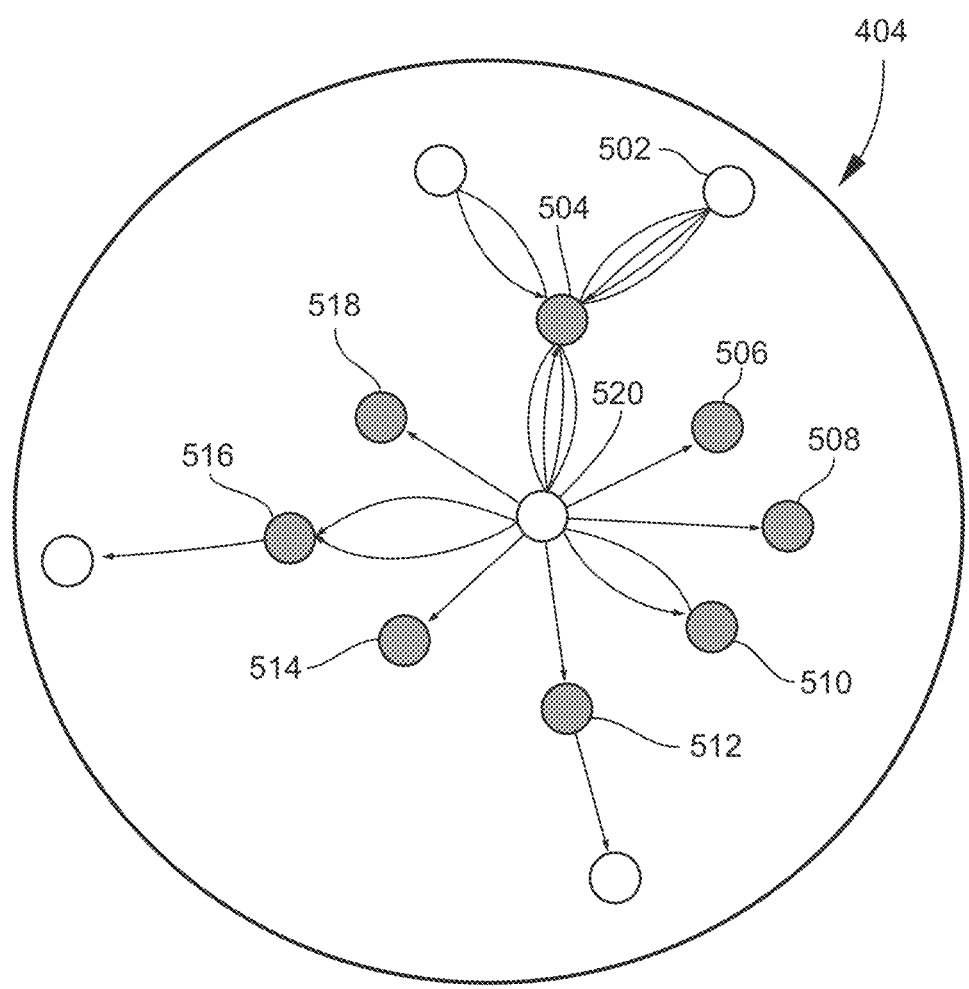
FIG. 5 illustrates an enlarged view of largest of the five encapsulated entities shown on the example visualization of FIG. 4.

FIG. 5 illustrates an enlarged view of largest of the five encapsulated entities shown on the example visualization of FIG. 4. Referring to FIG. 5, the visualization for embodiments of the invention may show, for example, connections between entities without a history of anomalous activity and other entities with a history of such activity that may uncover connectivity between such entities indicative of anomalous behavior. For example, multiple interactions performed by an entity without a history of anomalous activity, such as entity 502, to an entity with a history of such activity, such as entity 504, may merit investigation. For another example, multiple entities with a history of such activity, such as entities 504, 506, 508, 510, 512, 514, 516, 518, transacting with an entity without a history of anomalous activity, such as entity 520, may likewise merit investigation. Moreover, an entity without a history of anomalous activity, such as entity 520, which is common to multiple entities with a history of such activity, may merit a focused investigation.

While these examples are direct indicators of potential fraudulent users, a machine learning system may detect much more subtle connections. For example, a machine learning system may analyze not just interactions between the users, but any other number of characteristics, actions, metadata, biographical data, location data, user device data, or any other data may be processed, analyzed, and used by the machine learning system to identify users that may have fraudulent tendencies. The machine learning system may recognize patterns between seemingly unrelated activities that, only when observed together, are indicators that a user may be more likely to participate in fraud.

For example, data indicating that users that have interactions with counterparties in a particular location is not indicative of fraud. Other data showing that users that conduct interactions using a particular communication application are not indicative of fraud. However, based on the analysis of millions of data points, the machine learning system may determine that a combination of factors, including users that conduct interactions with users in the particular location while using a particular communication application, may indicate a higher than expected level of fraud.

Figure 6:
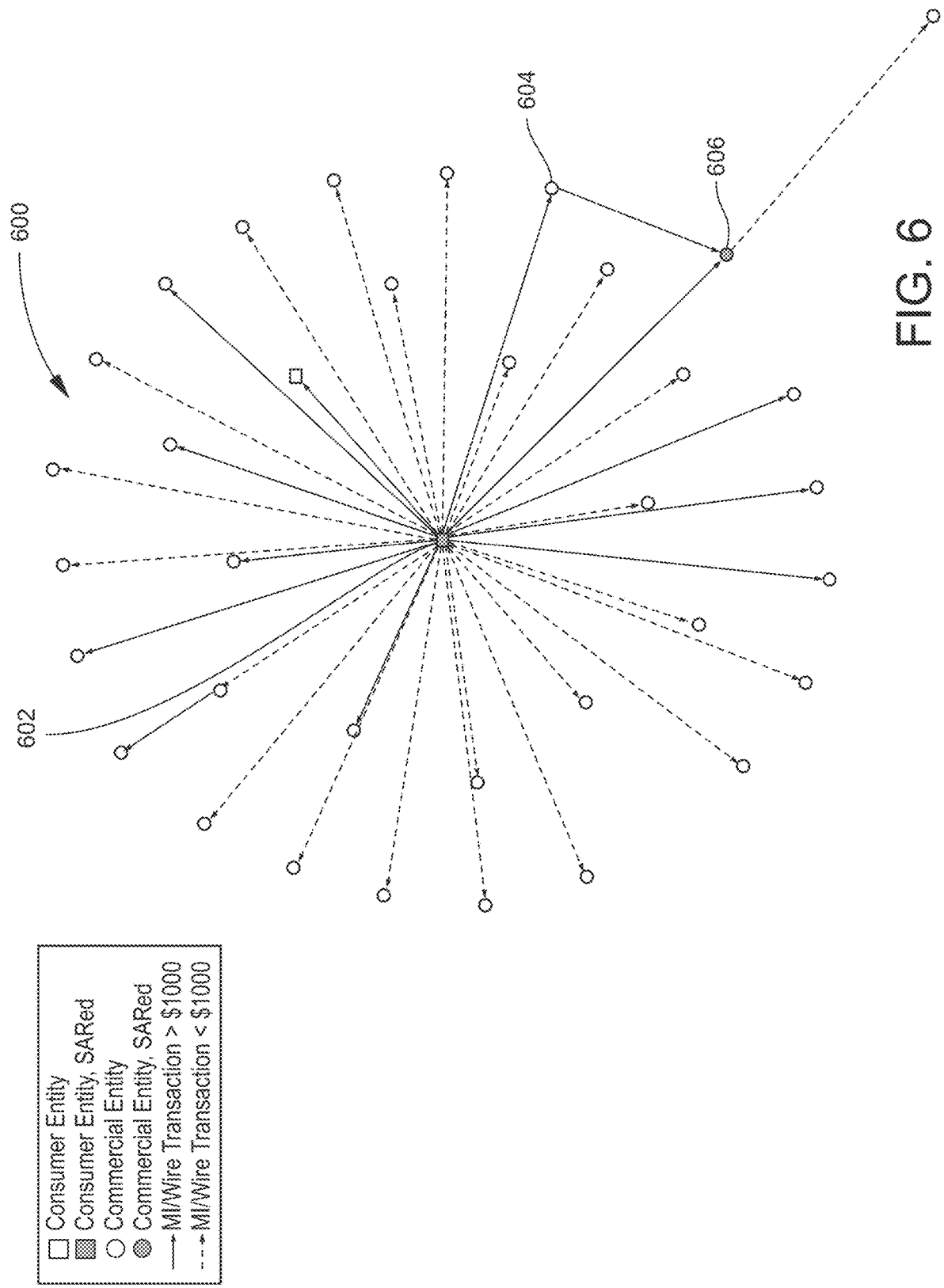
FIG. 6 illustrates an example of network analysis and visualization, according to embodiments of the invention, for an entity with a history of anomalous activity, such as a suspicious activity report.

FIG. 6 illustrates an example of network analysis and visualization according to embodiments of the invention for an entity with a history of anomalous activity, such as a suspicious activity report. Referring to FIG. 6, for example, a visualization of a network of money movement between entities 600 may be generated. In such visualization, monetary instruments and wire transactions between entities may be aggregated as either less than or greater than $1000, and the entities may be identified as either the subject of a suspicious activity report or not the subject of such a report.

Embodiments of the invention enable actual visualization of the network and suspected fraudulent activity in which movement of money may suggest an intent to commit a crime. Referring to FIG. 6, the visualization of multiple transactions greater than $1,000 sent by a commercial entity with a history of anomalous activity, such as commercial entity 602, to multiple different consumers may merit investigation. Referring further to FIG. 6, the 'triangle' of transactions between commercial entity 602, a consumer with no history of anomalous activity, such as consumer 604, and a consumer with a history of anomalous activity, such as consumer 606, may suggest an existence of funneling activity and raise questions as to the role of consumer 604.

According to embodiments of the invention, networks have attributes that can be mathematically described, and the mathematic components may be used to analyze and visualize properties and characteristics the networks. These network properties define network models, which aid in understanding how a network may evolve and what the network may be expected to look like at a certain time.

While this example is directed to money laundering, any other type of fraudulent interaction may be identified by a machine learning system. For example, interactions between users that are accessing multiple secure locations to retrieve data and then forwarding the data to a third party, may cause the machine learning system to identify the third party as a potential fraudulent actor. Any type of fraudulent activity and any type of interaction between fraudulent actors and others may be monitored and investigated.

In addition to the direct transfers of money described above, a machine learning system may detect much more subtle connections. For example, a machine learning system may analyze any other interactions between the users, such as communications, joint locations, social media interactions, or any other suitable interactions. The inferring of connections from otherwise unsuspicious activity is possible using a large-data driven machine learning system.

Figure 7:
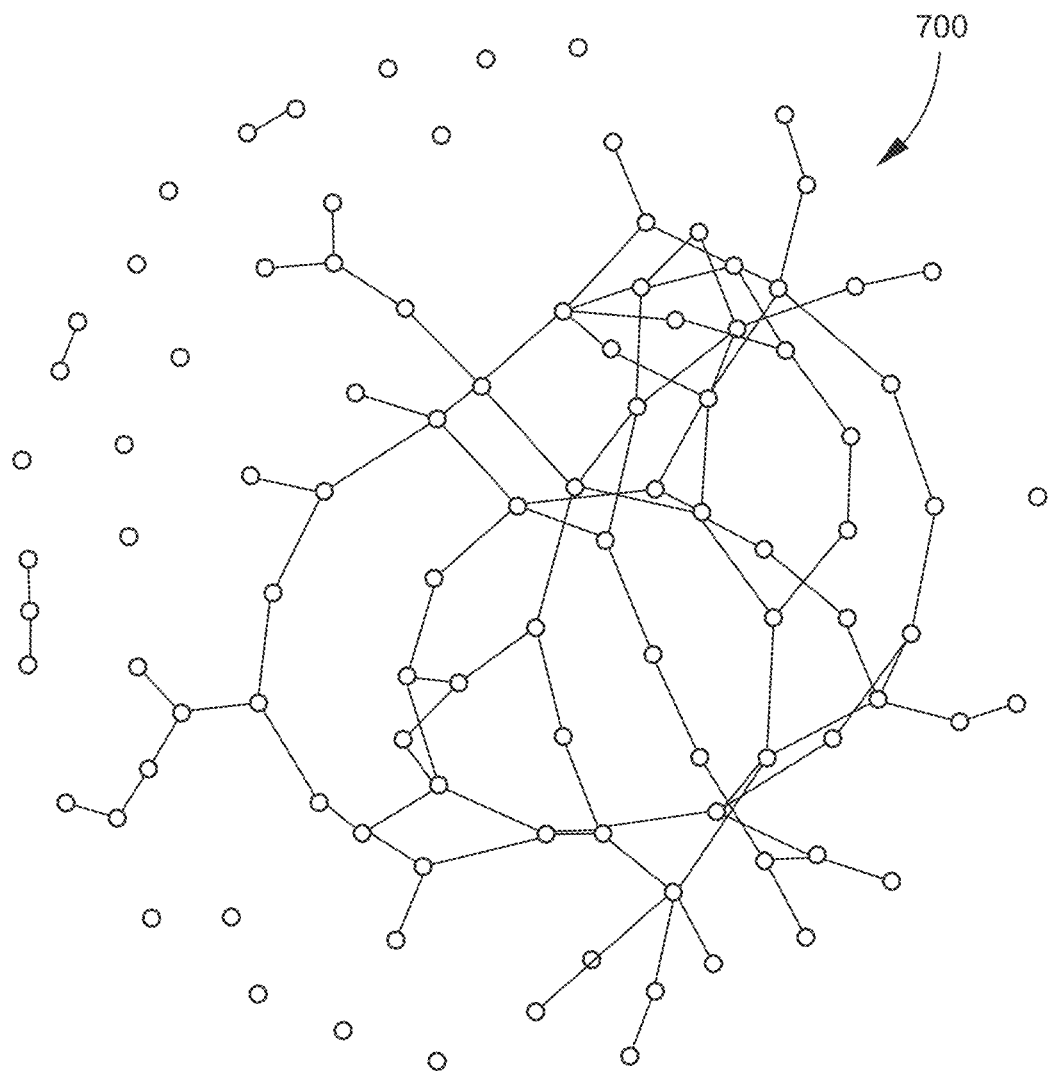
FIGS. 7 and 8 illustrate, respectively, examples of visualizations, according to embodiments of the invention, of a random network and a preferential attachment network.
Figure 8:
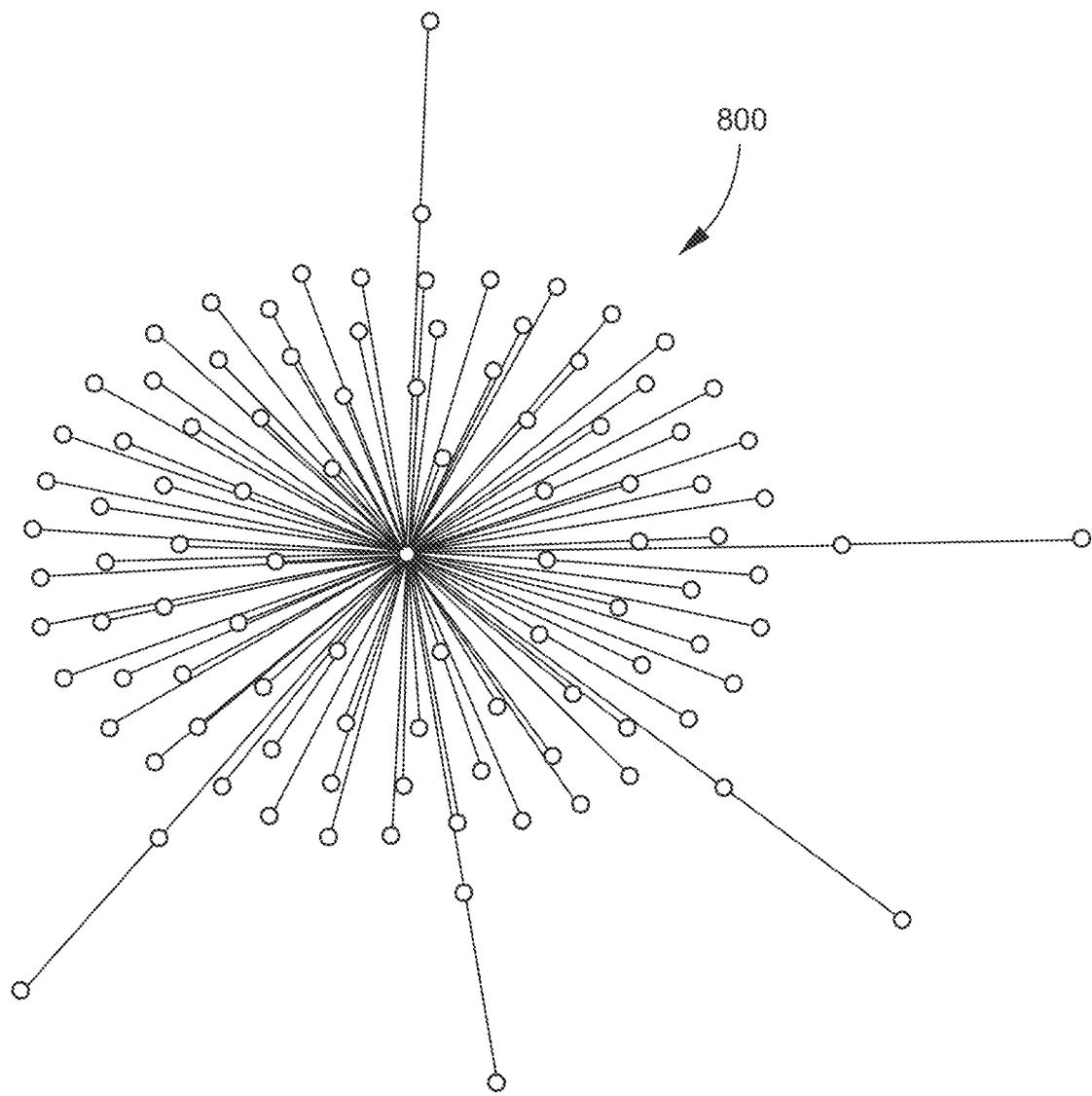

FIGS. 7 and 8 illustrate, respectively, examples of a random network 700 and a preferential attachment network 800, each having, for example, 100 entities and 99 connections. Referring to FIG. 7, the random network 700 may represent an example of a visualization created by a machine learning system of entities connecting to one another with little predicable logic. An example of such a random network may be people meeting at random at a rock concert. On the other hand, referring to FIG. 8, the preferential network 800 created by a machine learning system may represent entities, each of whom is a fan seeking a connection with a preferred entity, such as a fan club president who is a personal friend of a star of a rock concert with backstage passes to distribute.

Network modeling elements for embodiments of the invention may include, for example, variables such as density, size, average degree, average path length, and clustering coefficient. The density variable may include, for example, a ratio of a number of connections to a number of possible connections in a network, and the size variable may include, for example, a number of entities in the network. The average degree variable may include, for example, a number of connections attached to the entity, and the average path length variable may include, for example, a number of steps required to get from one entity in the network to another. Finally, the clustering coefficient variable may include, for example, a measure of an 'all-my-friends-know-each-other' property, sometimes also described as 'friends-of-my-friends-are-my-friends'. More precisely, the clustering coefficient may be a ratio of existing connections attaching the neighbors of an entity to one another to a maximum possible number of such connections. The variables may be set by a human operator, however, subtle variables that are more remote or insubstantial may be inferred by a machine learning system based on analyses of the user data. The variable may not even be describable to a human analyst but are observed by the machine learning system based on these unseen connections or patterns.

Figure 9:
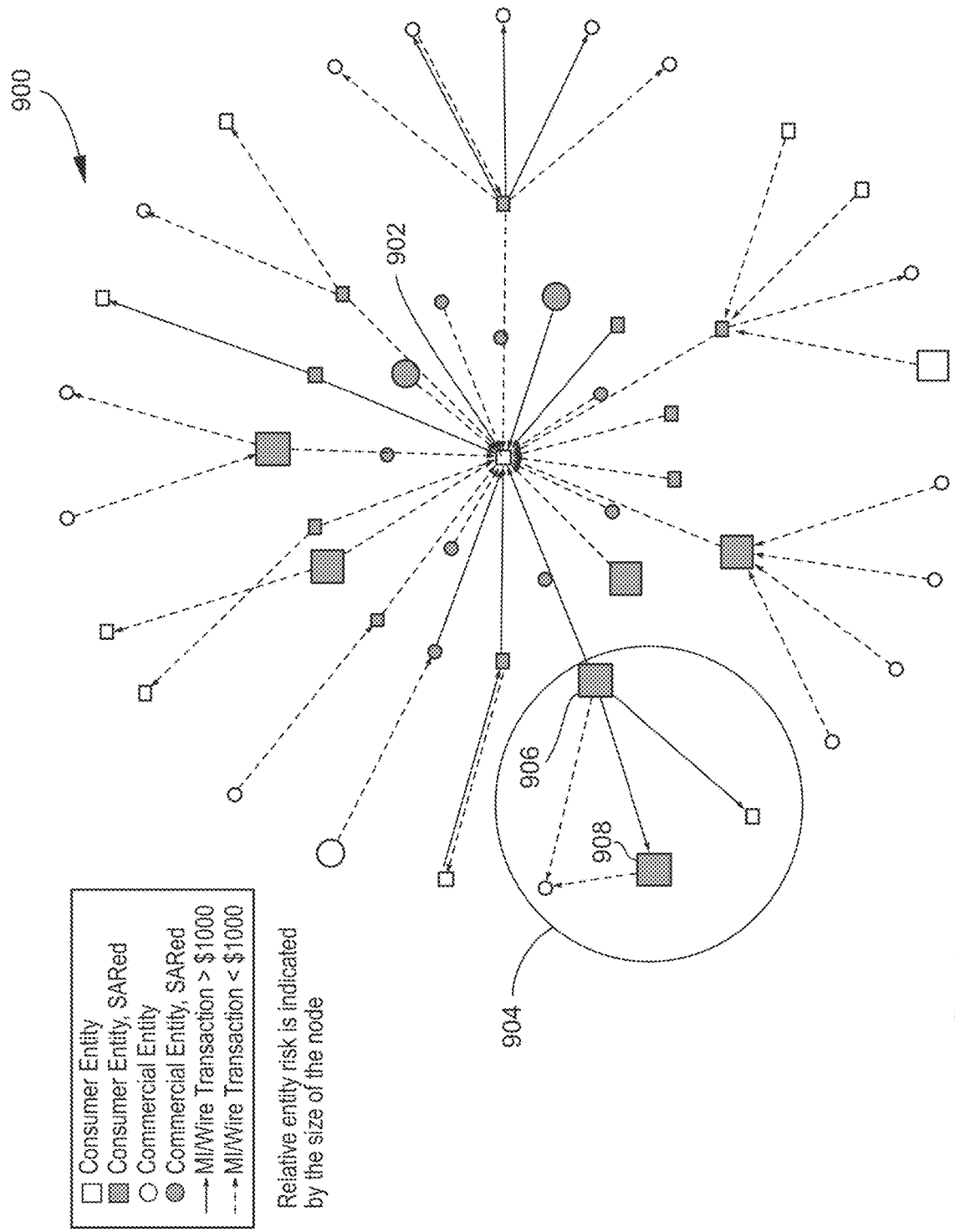
FIG. 9 illustrates an example of network analysis and visualization according to embodiments of the invention which reveals evidence of a high coefficient of clustering.

FIG. 9 illustrates an example of network analysis and visualization according to embodiments of the invention that reveals evidence of a high coefficient of clustering, also referred to as high local clustering between entities. Referring to FIG. 9, as before, monetary instruments and wire transactions between entities may be aggregated as either less than or greater than $1000, and the entities may be identified as either the subject of a suspicious activity report or not the subject of such a report. In addition, machine learning algorithms for embodiments of the invention may be employed to indicate the risk level of the entity and to visualize a size of node representing an entity as proportional to a level of risk associated with the entity.

Referring further to FIG. 9, it may be noted that the network visualization 900 discloses a significant number of commercial and non-commercial entities with histories of anomalous behavior transacting with a commercial entity 902 at the center of the network that does not have a history of anomalous behavior. It may likewise be noted that the network visualization 900 also discloses multiple non-commercial entities transferring money to a commercial entity with a history of anomalous behavior that may be an indication of funneling. Finally, it may be noted that the network visualization 900 also discloses the occurrence of high local clustering at 904 that may indicate a high probability that commercial entities 906, 908, both with a history of anomalous behavior, may transact in the future.

Figure 11:
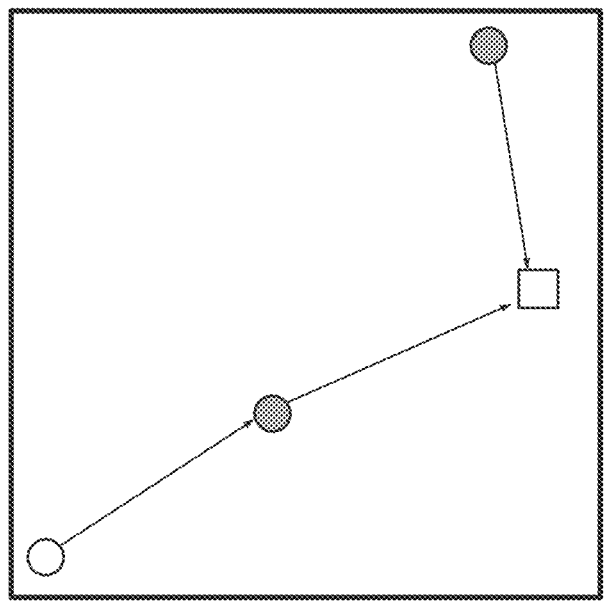
FIG. 11 illustrates an example of network analysis and visualization, according to embodiments of the invention, for the community of the case of FIG. 10.
Figure 11:
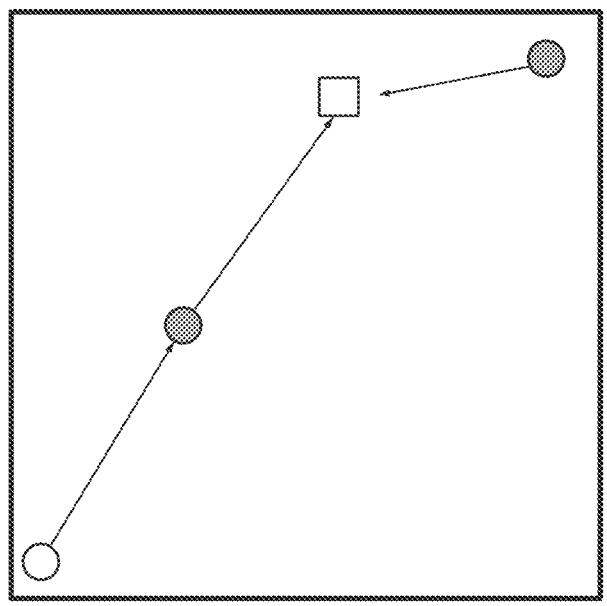

In embodiments of the invention, network attributes may have mathematical characteristics that may be employed as 'search arguments' to locate specific communities. For example, as shown in the example table of FIG. 10, a specific pattern may be found in data for a particular month for cases which were previously investigated and closed, and identical values may be found in data for two months later in such cases. Further, as shown in the example of FIG. 11, in network visualizations for these same two periods, the communities may have the same types of commercial and non-commercial entities, the same entities for which suspicious activity was reported, and flow of funds in the same directions. Thus, back-testing for embodiments of the invention may lead to a network metric definition for suspicious activity reports.

FIG. 12 is a flow chart that illustrates an overview example of the graphical user interface electronic data visualization process for embodiments of the invention. Referring to FIG. 12, at S1, one or more processors coupled to memory, using a machine learning system, may generate, in a relationship visualization aspect of a graphical user interface, a visualization consisting at least in part of a plurality of icons, such as shown in each of FIGS. 1-8 and 11, each icon representing a transacting entity. At S2, the one or more processors, using a machine learning system, may activate, in the relationship visualization aspect of the graphical user interface, a visualization consisting at least in part of an element, such as likewise shown in each of FIGS. 1-8 and 11, disposed between each of a plurality of pairs of said plurality of icons representing transactions between transacting entities. At S3, the one or more processors, using a machine learning system, may encapsulate, in the relationship visualization aspect of the graphical user interface, a visualization of at least one community of icons consisting of at least a portion of said plurality of pairs of icons, such as shown in FIGS. 2 and 4, at least one member of said community of icons representing a transacting entity having a history of anomalous transactions.

As noted, in embodiments of the invention, network attributes can be mathematically described. Thus, the metrics for embodiments of the invention may be used, for example, to describe existing networks and to find all or parts of networks fitting a particular description. Further, metrics for embodiments of the invention may, for example, use modeling theory to help understand how networks may evolve. In addition, metrics for embodiments of the invention may be used, for example, to find high local clustering communities and predict how such communities may evolve and to find similar types of networks in different data sets.

In particular, in the realm of fraud, the metrics for embodiments of the invention may be used, for example, to describe existing networks and to highlight potential suspicious behavior patterns, to find networks or parts of networks fitting a particular description, and to locate 'triangles' which may indicate funneling activity. Further, in the fraud realm, the metrics for embodiments of the invention may use, for example, modeling theory to help understand how networks may evolve or how entities may evolve as "preferential attachment entities' making them highly suspicious.

Additionally, in dealing with fraud, the metrics for embodiments of the invention may be employed to use machine learning to find high local clustering communities and predict how such communities are likely to evolve. Further, the metrics for embodiments of the invention may be employed to determine, for example, if a 'friend of my friend' is also a suspicious entity. Moreover, the metrics for embodiments of the invention may be used in the fraud realm to find similar types of networks in different data sets and to rapidly focus on behavior that is likely to result in a suspicious activity report.

The machine learning system uses the created user models and identified clusters to predict how the communities may evolve by simulating future actions. The models are created as described herein by receiving inputs of the actions of vast numbers of users over the lifecycle of each user. Each action of the users is correlated with inputs and other stimuli that each user receives using one or more of the machine learning algorithms described herein. The models are able to predict how a simulated user model will react to situations by providing simulated inputs to the model. In an example, the machine learning system can select a typical set of stimuli or situations to which a user may be expected to encounter over a user lifecycle and simulate how a user experience will likely evolve. For example, the machine learning system may simulate how a user will evolve to perform a greater number of fraudulent actions when involved in a community of other fraudulent actors.

In another example, the machine learning system may predict how entire communities will evolve. By simulating a lifecycle of situations and interactions for each member of a community and the community as a whole, the machine learning system is able to predict how communities are likely to evolve in various situations. For example, the machine learning system may provide inputs that cause the models to simulate different inputs such as additional economic pressures, changes in locations, changing numbers of interactions for users, harsher rules from the institution, more users being introduced to the community, aging of users, governmental changes, legal changes, or any other type of community inputs.

The machine learning system uses the prediction of the evolution of users and communities to bias the monitoring of actual users. In an example, the machine learning system may predict that when the institution reduces the oversight of certain rules, simulated users begin to increase their interactions with other users and increase their fraud rates. Based on this knowledge, the system using the machine learning system is able identify patterns in behaviors of actual users that mimic the simulated behaviors after a rule change.

By predicting how communities will evolve over time, the machine learning system provides recommendations to an institution to prevent or alter the evolution. For example, if the machine learning system predicts that users that interact with other users in a specific location evolve to become increasingly fraudulent, then the institution may limit communications with users in the specific location.

Other aspects of embodiments of the invention may involve, for example, various display and graphical user interface components to enable selection and display of a specific network of interest, such as a network or community identified using network analysis metrics for embodiments of the invention. For example, such display and graphical user interface components may graphically depict key insights such as transaction amount and count reflected, for example, in a size, such as a length or width of a connection, and segmentation values reflected in a shape, such as a circle, star, or octagon, of a symbol or icon representing a network entity.

Further, such display and graphical user interface components for embodiments of the invention may graphically depict other key insights such as highlighting suspicious transaction patterns with symbols or icons, such as triangles or squares, and showing relative risks of entities and connections by depicting symbols or icons representing such entities and connections, for example, in sizes proportionate to a level of risk or colors in colors of an intensity proportionate to a level of risk.

Machine Learning

Machine learning is a field of study within artificial intelligence that allows computers to learn functional relationships between inputs and outputs without being explicitly programmed.

The term "Artificial Intelligence" refers to a quantitative method, system, or approach ("techniques") that emulates human intelligence via computer programs. These can be used to make estimates, predictions, recommendations, or decisions in manners that go beyond classical statistical, mathematical, econometric, or financial approaches.

Machine learning is the subset of AI that derives representations or inferences from data without explicitly programming every parameter representation or computer step (for example, Random Forest or Artificial Neural Network based algorithm approaches). In contrast, AI techniques that are not members of the machine learning subset include techniques such as fuzzy logic, complex dependency parsing techniques for natural language processing.

Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example using user purchasing histories and geolocations to offer real-time incentives for purchases with a payment instrument to an identified high spend event to users likely to switch payment instruments. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include transaction data, which can be provided to the classifying machine learning algorithm and then placed into categories of, for example, transactions with payment instrument X, transactions at geolocation Y, or incentives provided that prompted a change in payment instrument. Regression algorithms aim at quantifying and correlating one or more features. Training data teaches the regression algorithm how to correlate the one or more features into a quantifiable value.

Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as geolocation can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as user interaction histories and the respective target output data such as whether a user is likely to conduct a fraudulent interaction.

Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys. The machine learning module then learns by connecting queries to their keys and separating queries from their non-keys. A loss function, such as those described herein, is used to minimize the distance between positive data pairs (e.g., a query to its key) while maximizing the distance between negative data points. See e.g., Tian, Yonglong, et al. "What makes for good views for contrastive learning?" Advances in Neural Information Processing Systems 33 (2020): 6827-6839.

Pre-Trained Learning

In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. See e.g., Diamant N, et al. Patient contrastive learning: A performant, expressive, and practical approach to electrocardiogram modeling. PLOS Comput Biol. 2022 Feb. 14; 18(2):e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise interaction histories and, when provided to a trained machine learning module, results in output data such as users that are likely to perform fraudulent interactions. The output can then be provided to the incentive system to use in determining what incentives to offer to certain users. As such, the identification-related technical problem of determining when a user that is likely to change payment instruments is at a high spend event can be solved using the herein-described techniques that utilize machine learning to produce outputs of whether a user is likely to conduct a fraudulent interaction.

ALGORITHMS

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating whether a user is likely to conduct a fraudulent interaction.

The methods described herein can be implemented with more than one machine learning method. The machine learning system can use a combination of machine learning algorithms. The machine learning algorithms may be of the same type or of different types. For example, a first machine learning algorithm may be trained for a first type of result, while a second machine learning algorithm may be trained for a second type of result. In certain examples, the first type of result may be an input into the second machine learning algorithm, while in other examples, the two results are combined to produce a third result. In certain examples, the first and second types of results are both inputs into a third machine learning algorithm that produces the third result.

Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be $y=mx+b$. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, user interaction histories are used as the independent variables to train a LiR machine learning module, which, after training, is used to estimate, for example, whether a user is likely to conduct a fraudulent interaction.

Logistic Regression (LoR)

In one example embodiment, logistic regression machine learning is implemented. Logistic Regression, often considered a LiR type model, is typically used in machine learning to classify information, such as user interaction histories into categories such as whether a user is likely to conduct a fraudulent interaction. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, user interaction histories are used as the independent variables to train a LoR machine learning module, which, after training, is used to estimate, for example, whether a user is likely to conduct a fraudulent interaction.

Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, user interaction histories are mapped to the BN graph to train the BN machine learning module, which, after training, is used to estimate whether a user is likely to conduct a fraudulent interaction.

Random Forest

In one example embodiment, random forest ("RF") is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, user interaction histories are used to train the nodes of the decision trees of a RF machine learning module, which, after training, is used to estimate whether a user is likely to conduct a fraudulent interaction.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding under-performing nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine a user interaction histories and gradient boosting is applied to the tree to improve its ability to accurately determine whether a user is likely to conduct a fraudulent interaction.

Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for user interaction histories is defined by a set of input neurons that can be given input data such as user transactions. The input neuron weighs and transforms the input data and passes the result to other neurons, often referred to as "hidden" neurons. This is repeated until an output neuron is activated. The activated output neuron produces a result. In example embodiments, user transaction histories and secondary user actions or data are used to train the neurons in a NN machine learning module, which, after training, is used to estimate whether a user is likely to conduct a fraudulent interaction.

Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from user interaction histories are used as an input signal into a CAE which reconstructs that signal into an output such as a whether a user is likely to conduct a fraudulent interaction.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, user interaction histories are used to train the neurons of a deep learning module, which, after training, is used to estimate whether a user is likely to conduct a fraudulent interaction.

Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such user interaction histories, comprises of a multidimensional vector. A CNN, typically, comprises of three layers: convolution, pooling, and fully connected. The convolution and pooling layers extract features and the fully connected layer combines the extracted features into an output, such as whether a user is likely to conduct a fraudulent interaction.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al Convolutional neural networks: an overview and application in radiology. *Insights Imaging* 9, 611-629 (2018).

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as user interaction histories is received by a RNN, which determines whether a user is likely to conduct a fraudulent interaction. See Sherstinsky, Alex. "Fundamentals of recurrent neural network (RNN) and long short-term memory (LSTM) network." Physica D: Nonlinear Phenomena 404 (2020): 132306.

Long Short-term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tan h, and RELU. See Zhu, Xiaodan, et al. "Long short-term memory over recursive structures." International Conference on Machine Learning. PMLR, 2015.

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, user interaction histories are used to train the relationship matrix R in a matrix factorization machine learning module. After training, the relationship matrix R and input matrix F, which comprises vector representations of user interaction histories, results in the prediction matrix P comprising whether a user is likely to conduct a fraudulent interaction.

Hidden Markov Model

In example embodiments, a hidden Markov model is implemented. A HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. A HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, user interaction histories are used to train the nodes/states of the HMM machine learning module, which, after training, is used to estimate whether a user is likely to conduct a fraudulent interaction.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of a SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, user interaction histories are used to train the linear equation or kernel function of the SVM machine learning module, which, after training, is used to estimate whether a user is likely to conduct a fraudulent interaction.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, user interaction histories are used to train the centroids of a KMC machine learning module, which, after training, is used to estimate whether a user is likely to conduct a fraudulent interaction.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized. In example embodiments, user interaction histories are used to train a KNN machine learning module, which, after training, is used to estimate whether a user is likely to conduct a fraudulent interaction.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the module described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other.

In example embodiments, the MT may comprise of a machine learning method further described herein. In an example embodiment, the MT comprises a neural network, deep neural network, convolutional neural network, convolutional autoencoder, recurrent neural network, or an LSTM. For example, one or more microscopy imaging data comprising multiple modalities from a subject is embedded as further described herein. The embedded data is then received by the machine learning module. The machine learning module processes the embedded data (e.g. encoding and decoding) through the multiple layers of architecture then determines the corresponding the modalities comprising the input. The machine learning methods further described herein may be engineered for MT wherein the inputs described herein comprise of multiple modalities. See e.g. Sulubacak, U., Caglayan, O., Grönroos, SA. et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

The ladder diagrams, scenarios, flowcharts and block diagrams in the figures and discussed herein illustrate architecture, functionality, and operation of example embodiments and various aspects of systems, methods, and computer program products of the present invention. Each block in the flowchart or block diagrams can represent the processing of information and/or transmission of information corresponding to circuitry that can be configured to execute the logical functions of the present techniques. Each block in the flowchart or block diagrams can represent a module, segment, or portion of one or more executable instructions for implementing the specified operation or step. In example embodiments, the functions/acts in a block can occur out of the order shown in the figures and nothing requires that the operations be performed in the order illustrated. For example, two blocks shown in succession can executed concurrently or essentially concurrently. In another example, blocks can be executed in the reverse order. Furthermore, variations, modifications, substitutions, additions, or reduction in blocks and/or functions may be used with any of the ladder diagrams, scenarios, flow charts and block diagrams discussed herein, all of which are explicitly contemplated herein.

The ladder diagrams, scenarios, flow charts and block diagrams may be combined with one another, in part or in whole. Coordination will depend upon the required functionality. Each block of the block diagrams and/or flowchart illustration as well as combinations of blocks in the block diagrams and/or flowchart illustrations can be implemented by special purpose hardware-based systems that perform the aforementioned functions/acts or carry out combinations of special purpose hardware and computer instructions. Moreover, a block may represent one or more information transmissions and may correspond to information transmissions among software and/or hardware modules in the same physical device and/or hardware modules in different physical devices.

The present techniques can be implemented as a system, a method, a computer program product, digital electronic circuitry, and/or in computer hardware, firmware, software, or in combinations of them. The system may comprise distinct software modules embodied on a computer readable storage medium; the modules can include, for example, any or all of the appropriate elements depicted in the block diagrams and/or described herein; by way of example and not limitation, any one, some, or all of the modules/blocks and or sub-modules/sub-blocks described. The method steps can then be carried out using the distinct software modules and/or sub-modules of the system, as described above, executing on one or more hardware processors.

It is to be understood that embodiments of the invention may be implemented as processes of a computer program product, each process of which is operable on one or more processors either alone on a single physical platform, such as a personal computer, a laptop computer, a smart phone, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and/or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C #, Visual Basic, Java, Python, Perl, and JavaScript.

In addition, it is to be understood that client devices that may be employed by embodiments of the invention may also comprise a number of external or internal devices, such as a CD-ROM, DVD, touchscreen display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
   by one or more processors coupled to memory:
   automatically generating, using a machine learning algorithm, a network model of each interacting user of a plurality of interacting users of an institution, the network model being based on variables of interactions of each user comprising each of density, size, average degree, average path length, and a clustering coefficient;
   automatically generating, using the machine learning algorithm, a visualization in a graphical user interface of encoded data in the network model comprising encoded data attributes of each of the plurality of interacting users relating to user risk level, user history of reports to authorities, user type, and user interactions for interacting users having both direct and indirect connections to one another and interacting users both with and without histories of anomalous interactions displayed as visual nodes;
   inputting into the machine learning algorithm, network analysis variables to obtain a level of local clustering based on the network analysis variables, wherein the network analysis variables comprise a ratio of links connecting a plurality of pairs to at least one member of each of a plurality of communities of icons representing an interacting user having a history of anomalous interactions to a maximum possible number of links connecting between the plurality of pairs of icons, wherein the machine learning algorithm is trained to determine the level of local clustering based on patterns, connections, correlations, or trends within the network analysis variables;
   automatically detecting, using the machine learning algorithm, at least one community of the plurality of communities of icons within the plurality of pairs of icons having or exceeding a predetermined level of local clustering indicative of a suspicious activity based on the level of local clustering; and
   automatically generating, using the machine learning algorithm, the visualization of a size of the at least one community of the plurality of communities of icons based on a level of associated risk determined based on the level of local clustering.

2. The method of claim 1, wherein said at least one member of each of the plurality of communities of icons further comprises the at least one member of each of the plurality of communities of icons representing a first interacting user reported to a governmental authority for suspected unlawful activity.

3. The method of claim 1, further comprising encapsulating a corresponding visualization of each of the plurality of communities of icons, wherein the at least one member of each of the plurality of communities is determined based on predictions of the machine learning algorithm of a type of visualization that will be likely to be recognized by a human observer.

4. The method of claim 1, further comprising predicting, by the machine learning algorithm, a change in actions of members of the users in each of the plurality of communities of icons based on similarities of the network model of each interacting user to user histories of other users of the institution.

5. The method of claim 1, wherein the icons of the network model of each interacting user varies based on a suspected level of fraudulent activity of each respective interacting user.

6. The method of claim 5, further comprising predicting, by the machine learning algorithm, a change in actions of a particular community of the plurality of communities of icons based on similarities of the network model of each interacting user of the particular community to user histories of other users of the institution.

7. The method of claim 1, further comprising receiving, by the one or more processors, new encoded data comprising at least in part of encoded interaction data attributes of each of the plurality of interacting users of the institution.

8. The method of claim 7, wherein the encoded interaction data attributes further comprise corresponding encoded interaction data attributes of each of the plurality of interacting users of a financial institution related to an interaction history for a pre-defined period of time.

9. The method of claim 1, further comprising receiving, by the one or more processors, new encoded data comprising at least in part encoded interaction data attributes of each of the plurality of interacting users related to a plurality of interactions between interacting users represented by each of said plurality of pairs of icons.

10. The method of claim 1, wherein an interaction is a request for secure data.

11. The method of claim 1, wherein an interaction is a request for an insurance claim.

12. The method of claim 1, wherein an interaction is a request for access to a secure location.

13. The method of claim 1, wherein an interaction is a financial transaction.

14. The method of claim 13, wherein encoded interaction data attributes related to a plurality of interactions between interacting users further comprises encoded interaction data elements representing an aggregated value of the plurality of interactions between the interacting users, a total transaction amount and count for the plurality of interactions, and an average time lag between the interactions.

15. The method of claim 1, wherein a link connecting each of the plurality of pairs of a plurality of icons representing interactions between interacting users further comprises an indicator of a direction of flow of interaction requests.

16. The method of claim 1, wherein a link having an appearance indicating a transaction amount and a count of transactions between transacting entities is associated with a size indicating the transaction amount and the count of transactions between transacting customers of the institution.

17. The method of claim 1, wherein the links connecting between the plurality of pairs are visualized with an appearance indicating a level of risk of unlawful activity associated with each interaction.

18. A system, comprising:
one or more processors utilizing a machine learning algorithm, memory coupled to the one or more processors and configured for storing instructions, which, when executed by the one or more processors, causes the one or more processors to perform operations comprising;
automatically generating, using the machine learning algorithm, a network model of each interacting user of a plurality of interacting users of an institution, the network model being based on variables of interactions of each user comprising each of density, size, average degree, average path length, and a clustering coefficient;
automatically generating, using the machine learning algorithm, a visualization in a graphical user interface of encoded data in the network model comprising encoded data attributes of each of the plurality of interacting users relating to user risk level, user history of reports to authorities, user type, and user interactions for interacting users having both direct and indirect connections to one another and interacting users both with and without histories of anomalous interactions displayed as visual nodes;
inputting into the machine learning algorithm, network analysis variables to obtain a level of local clustering based on the network analysis variables, wherein the network analysis variables comprise a ratio of links connecting a plurality of pairs to at least one member of each of a plurality of communities of icons representing an interacting user having a history of anomalous interactions to a maximum possible number of links connecting between the plurality of pairs of icons, wherein the machine learning algorithm is trained to determine the level of local clustering based on patterns, connections, correlations, or trends within the network analysis variables;
automatically detecting, using the machine learning algorithm, at least one community of the plurality of communities of icons within the plurality of pairs of icons having or exceeding a predetermined level of local clustering indicative of a suspicious activity based on the level of local clustering; and
automatically generating, using the machine learning algorithm, the visualization of a size of the at least one community of the plurality of communities of icons based on a level of associated risk determined based on the level of local clustering.

* * * * *